(12) United States Patent
Larsson et al.

(10) Patent No.: US 9,474,918 B2
(45) Date of Patent: Oct. 25, 2016

(54) DESCENDING DEVICE WITH DIRECT DRIVE CENTRIFUGAL BRAKE

(71) Applicant: CRESTO AB, Halmstad (SE)

(72) Inventors: Linus Larsson, Göteborg (SE); Sebastian Roos, Göteborg (SE); Ove Larsson, Västra Frölunda (SE)

(73) Assignee: Cresto AB, Halmstad (SE)

( * ) Notice: Subject to any disclaimer, the term of this patent is extended or adjusted under 35 U.S.C. 154(b) by 0 days.

(21) Appl. No.: 14/366,695

(22) PCT Filed: Dec. 20, 2012

(86) PCT No.: PCT/EP2012/076262
§ 371 (c)(1),
(2) Date: Jun. 19, 2014

(87) PCT Pub. No.: WO2013/098171
PCT Pub. Date: Jul. 4, 2013

(65) Prior Publication Data
US 2014/0318896 A1 Oct. 30, 2014

(30) Foreign Application Priority Data
Dec. 29, 2011 (EP) .................................. 11196042

(51) Int. Cl.
*A62B 1/10* (2006.01)
*A62B 35/00* (2006.01)
*A62B 1/08* (2006.01)

(52) U.S. Cl.
CPC ............. *A62B 35/0093* (2013.01); *A62B 1/08* (2013.01); *A62B 1/10* (2013.01); *Y02B 10/30* (2013.01)

(58) Field of Classification Search
CPC ............. A62B 1/06; A62B 1/08; A62B 1/10
See application file for complete search history.

(56) References Cited

U.S. PATENT DOCUMENTS 23,499 A * 4/1859 Reed ......................... B66D 1/04
254/266
324,670 A * 8/1885 Doolittle ................... A62B 1/10
182/234

(Continued)

FOREIGN PATENT DOCUMENTS

CA 1036999 8/1978
CA 1062180 9/1979

(Continued)

OTHER PUBLICATIONS

European Search Report for counterpart EPO application No. 1196042.3-1269, Issued Jul. 9, 2012, EPO, Netherlands.

(Continued)

*Primary Examiner* — Alvin Chin-Shue
(74) *Attorney, Agent, or Firm* — Babcock IP, PLLC (57) ABSTRACT

The present invention relates to a descending device for repeated braked descent of a load from an elevated structure. The descending device comprises a housing attachable to the elevated structure; a descent shaft rotatably attached to the housing; a centrifugal brake comprising a fixed part connected to the housing and a rotatable part connected to the descent shaft; and a rope configured for attachment of the load at two different load attachment portions being separated by a descent length of the rope. The descent shaft is directly connected to the rotatable part of the centrifugal brake such that one revolution of the descent shaft translates to one revolution of the rotatable part of the centrifugal brake; and the winding angle is at least 360°.

13 Claims, 12 Drawing Sheets

(56) References Cited

U.S. PATENT DOCUMENTS

| | | | | |
|---|---|---|---|---|
| 1,116,434 | A | * | 11/1914 | Johansson ............... 254/391 |
| 1,782,951 | A | * | 11/1930 | Abbott et al. ............ 182/239 |
| 2,623,732 | A | * | 12/1952 | Morgan .................. 254/391 |
| 3,210,050 | A | * | 10/1965 | Harmony ........... B66D 1/7447 188/65.1 |
| 3,807,696 | A | * | 4/1974 | Brda ..................... 254/391 |
| 4,173,332 | A | * | 11/1979 | DuLondel ............... 254/391 |
| 4,351,417 | A | | 9/1982 | Seiz et al. |
| 4,538,703 | A | * | 9/1985 | Ellis ..................... A62B 1/10 182/10 |
| 4,721,285 | A | * | 1/1988 | McMichael ......... B66D 1/7447 226/175 |
| 4,753,399 | A | * | 6/1988 | Baum ................... B66D 1/30 242/118.4 |
| 4,949,812 | A | * | 8/1990 | Arthur et al. ............ 182/234 |
| 5,540,307 | A | * | 7/1996 | Pickering .............. A62B 1/14 188/188 |
| 6,578,823 | B1 | * | 6/2003 | Johnson ............. B66D 1/7442 242/602.2 |
| 2004/0168855 | A1 | * | 9/2004 | Leon ..................... 182/236 |
| 2012/0061183 | A1 | * | 3/2012 | Michael ................. 182/231 |

FOREIGN PATENT DOCUMENTS

| | | | |
|---|---|---|---|
| CN | 87213542 U | 3/1988 | |
| CN | 2288739 Y | 8/1998 | |
| DE | 2332018 | 1/1975 | |
| DE | EP 0624387 A1 * | 11/1994 | ............. A62B 1/06 |
| DE | 102007002435 | 7/2008 | |
| FR | 1210945 | 3/1960 | |
| FR | 2263001 | 10/1975 | |

OTHER PUBLICATIONS

Chinese Patent Office Official Action for related application CN2012800646450, Oct. 22, 2015, CIPO China.

Xia Zheng, Report Letter, Brief description of Chinese Office Action dated Oct. 22, 2015, Nov. 10, 2015.

* cited by examiner

DESCENDING DEVICE WITH DIRECT DRIVE CENTRIFUGAL BRAKE

FIELD OF THE INVENTION

The present invention relates to a descending device for repeated braked descent of a load from an elevated structure.

BACKGROUND OF THE INVENTION

Work is often carried out in elevated structures, such as high buildings or wind turbines. In the event of an emergency situation, it is necessary to be able to quickly and reliably evacuate workers from the elevated structure. For example, in the event of a serious accident, such as fire, in a wind turbine, any people in the wind turbine may need to self evacuate from elevations of over 100 meters. Since such a self evacuation is often carried out under stress and without any assistance from other personnel, the descending device used for the self evacuation should automatically and reliably keep the descent speed at a suitable level.

To provide for the desired reliability and ease of use, known descending devices typically include a centrifugal brake for limiting the descent speed.

A centrifugal brake typically comprises a fixed part and a rotatable part, where the rotatable part comprises radially movable brake shoes that are pressed towards the fixed part of the centrifugal part through the centrifugal force when the rotatable part rotates. The braking force by which the brake shoes are pressed against the fixed part is proportional to the square of the angular speed of the rotatable part, and proportional to the mass of the brake shoes and the radius of the rotatable part.

In particular in modern wind turbines etc, several persons may be in the elevated structure at the same time. The descending device should therefore be capable of rapid evacuation of several persons, and descending devices requiring rewinding of a rope on a drum between each descent are not favorable.

DE 10 2005 010 767 discloses a descending device for repeated braked descent of a load from an elevated structure, comprising a rope having two different load attachment portions being separated by a predefined descent length of the rope. The rope is partly wound around a descent shaft that is connected to the rotatable part of a centrifugal brake via a gear. A first descent is carried out by attaching the load (such as a person) to descend from the elevated structure to one of the load attachment portions, whereby the descent shaft will be brought to rotate in a first direction of rotation. When the first load has reached the ground, the subsequent descent is carried out by attaching the load to descend from the elevated structure to the other one of the load attachment portions, whereby the descent shaft will be brought to rotate in a second direction of rotation opposite the first direction of rotation.

To ensure that there is no slippage between the rope and the descent shaft, the descending device according to DE 10 2005 010 767 comprises a pulley with a generally V-shaped groove for providing a high friction between the pulley and the rope.

In the descending device according to DE 10 2005 010 767. a gear is provided between the descent shaft and the rotatable part of the centrifugal brake in order to increase the angular speed of the rotatable part of the centrifugal brake such that a sufficient braking force can be achieved for descent at a suitable speed. According to international regulations, descending devices should lower a person at a substantially constant speed of between 0.5 m/s and 2 m/s.

Although the descending device according to DE 10 2005 010 767 provides for repeated braked descent at a substantially constant speed, it would be desirable to provide a descending device with improved reliability.

Furthermore, to allow for manually controlled raising or lowering of a load, the descending device according to DE 10 2005 010 767 further comprises a crank that allows a user to manually rotate the descent shaft. The crank acts on the high-speed side of the gear, i.e. on the side of the rotatable part of the centrifugal brake. To prevent unwanted descent in case the user lets go of the crank, the crank is provided with a catch that can be manually activated depending on the desired direction of rotation. In an emergency situation, a user under stress may, however, use the crank incorrectly. In such cases, the user may, due to the gear ratio, destroy the gear, which may lead to failure of the descending device

SUMMARY OF THE INVENTION

In view of the above-mentioned and other drawbacks of the prior art, it is thus an object of the present invention to provide an improved and, in particular, more reliable descending device for repeated braked descent of a load from an elevated structure.

According to a first aspect of the present invention, it is therefore provided a descending device for repeated braked descent of a load from an elevated structure, the descending device comprising: a housing attachable to the elevated structure; a descent shaft rotatably attached to the housing; a centrifugal brake comprising a fixed part connected to the housing and a rotatable part connected to the shaft; and a rope configured for attachment of the load at two different load attachment portions being separated by a descent length of the rope, the rope being wound around the shaft along a winding angle being substantially constant during the braked descent, wherein: the descent shaft is directly connected to the rotatable part of the centrifugal brake such that one revolution of the descent shaft translates to one revolution of the rotatable part of the centrifugal brake; and the winding angle is at least 360°

It should be noted that the housing may be any structure that comprises means for rotatable attachment of the descent shaft and that the fixed part of the centrifugal brake may be an integral part of the housing or may be a separate part that is attached to the housing using suitable fastening means. Moreover, the housing may be substantially closed or may be an at least partly open structure. In any case, the housing comprises an opening for allowing passage of the rope in the direction of descent.

The "rope" may be a none-metallic rope or a metallic rope wire.

The fixed part of the centrifugal brake may have an inner surface with substantially circular cross-section. The inner surface of the centrifugal brake interacts with the rotatable part with a higher force the higher the rotational speed of the rotatable part gets.

The present invention is based on the realization that the reliability of a descending device for repeated braked descent can be substantially improved by directly connecting the rotatable part of the centrifugal brake to the descent shaft. Hereby, potential failures of the descending device due to malfunction of the gear between the descent shaft and the rotatable part of the centrifugal brake can be eliminated. The present inventors have further realized that such a direct drive of the rotatable part of the centrifugal brake can be achieved without a substantial increase in the dimensions of the centrifugal brake by having the rope wound around the descent shaft by a winding angle of at least 360°. Such a winding angle allows the use of a relatively small translation radius (the radius for translating the force acting along the rope to a torque acting on the rotatable part of the centrifugal brake) while still preventing slippage of the rope relative to the descent shaft. With a small translation radius, direct drive can be used without having to substantially increase the braking capability, and thus dimensions, of the centrifugal brake. To provide for a descending device that is suitable to be handled by one person, that is, is not to heavy and/or bulky, the diameter of the descent shaft should advantageously be less than 40 mm, preferably less than 30 mm.

A larger winding angle provides for a further increase in friction force between the rope and the descent shaft, which in turn allows an even smaller translation radius and accompanying decrease in the dimensions (including mass) of the centrifugal brake. The present inventors have found that it may be advantageous if the winding angle is at least 1260°, or 3.5 revolutions around the descent shaft.

The descent shaft may advantageously be configured to allow the rope to slide axially along the descent shaft to reduce the risk of "climbing" of the rope.

To reduce the occurrence of unwanted slippage between the rope and the descent shaft, the descending device may further comprise tensioning means arranged to provide a contact force between the rope and the descent shaft. The tensioning means may be arranged to always provide some contact force between the rope and the descent shaft, i.e. also when no descent is taking place, or the tensioning means may be arranged to provide a contact force in response to the initiation of a movement of the rope.

The tensioning means may advantageously comprise a braking arrangement connected to the housing and arranged to provide a braking force to the rope between the descent shaft and each of the load attachment portions of the rope. Due to the presence of such a braking force, pulling the rope will result in a contact force between the rope and the descent shaft.

According to various embodiments of the present invention, the braking arrangement may comprise at least one opening through which the rope runs during the descent, the at least one opening being configured in such a way that a friction force acts between the at least one opening and the rope. The braking arrangement may advantageously comprise two openings, one opening for rope moving downwards during the descent and one opening for rope moving upwards during the descent. Moreover, the at least one opening may advantageously be dimensioned to press against the rope, to thereby induce friction.

According to one embodiment, the at least one opening may be provided with spring loaded chokes, such as rubber rings or similar.

According to another embodiment, the desired friction can be achieved by having the rope pass in different directions through several openings, so that a force acting along the rope results in friction between walls of the openings and the rope. Such openings may, for example, be realized using a grating comprising a plurality of pins or bars.

According to various embodiments of the present invention, the descending device may advantageously comprise a first flange and a second flange arranged on the descent shaft for restricting movement of the rope in an axial direction in respect of the descent shaft during the braked descent.

The first and second flanges may be arranged to be rotationally stationary in relation to the descent shaft, so that rotation of the descent shaft results in a relative motion between the descent shaft and the first and second flanges.

When the rope comes into contact with either of the first and second flanges, there will be a friction force component acting on the rope to tension the rope and provide for the desired contact force between the rope and the surface of the descent shaft. In other words, the rotationally stationary flanges work as tensioning means.

With a winding angle of more than 360°, pulling the rope will result in a relative motion between the rope and the descent shaft in the axial direction, i.e. in a direction parallel to the rotational axis of the descent shaft. Through the provision of the above-mentioned first and second flanges, the rope can be prevented from "climbing" along the length of the descent shaft. In order not to introduce a too high friction between a rotationally stationary flange and the rope, at least the side of the flanges facing the rope may have a low-friction surface. For example, the flanges may be made of, or coated with, a low-friction material, such as PTFE.

Moreover, each of the first flange and the second flange may, on a side thereof facing the rope, be shaped in such a way that pressing the rope towards the flange in an axial direction along the descent shaft results in a force between the flange and the rope having a force component directed towards the descent shaft. In other words, the first and second flanges may advantageously be shaped to provide a contact force between the rope and the descent shaft, which means that the first and second flanges may act as tensioning means for preventing initial slippage between the rope and the descent shaft.

In order to provide the force component acting on the rope and being directed towards the descent shaft, the cross-section of each of the first and second flanges may, for example, be angled towards the rope. Of course, the cross-section need not follow a straight line, but may equally well be curved.

According to various embodiments, furthermore, at least one of the first flange and the second flange may be movable relative to the descent shaft in the axial direction, and the descending device may further comprise spring means arranged to press the at least one of the first and second flange towards the rope being wound around the descent shaft. Hereby, it can be ensured that some contact force is always provided between the rope and the descent shaft, i.e. also when no descent is taking place.

For providing a substantially uniform contact force between the first and second flanges and the rope, each of the first flange and the second flange may have a helical configuration on a side facing the rope, with a pitch substantially corresponding to that of the rope being wound around the descent shaft.

According to various embodiments of the present invention, there may be a first friction coefficient between the rope and the descent shaft in a tangential direction of the descent shaft and a second friction coefficient between the rope and the descent shaft in an axial direction of the descent shaft, the first friction coefficient being greater than the second friction coefficient. Hereby, relative movement in the axial direction between the rope and the descent shaft without "climbing" of the rope is facilitated.

The rope, the descent shaft or both may be configured to achieve this anisotropic friction property.

According to one embodiment, the descent shaft may be structured to provide a higher friction coefficient in the radial direction than in the axial direction.

This may, for example, be achieved by providing grooves on the descent shaft, the grooves extending in the axial direction of the descent shaft. The grooves may be substantially parallel to the rotational axis of the descent shaft, or may be spiraling to help push the rope axially along the descent shaft to facilitate pulling the rope through the descending device, in particular without load.

According to various embodiments, the fixed part of the centrifugal brake may be at least partly open, and the rotatable part of the centrifugal brake may comprises fan blades, for cooling the centrifugal brake during operation of the descending device. Such an open architecture may also be beneficial for use of the descending device in harsh conditions, such as in rain or snow in combination with freezing temperatures, since water can be drained from the centrifugal brake and thus not form ice, which might otherwise hamper operation of the descending device.

Moreover, the descending device may further comprise an auxiliary driving arrangement for manual rotation of the descent shaft to raise or lower the load, the auxiliary driving arrangement comprising a worm wheel connected to the descent shaft; a worm arranged on a worm shaft; and a crank connected to the worm shaft for allowing manual rotation of the descent shaft through a worm drive constituted by the worm wheel and the worm, wherein the worm shaft is displaceable in an axial direction between an operational position in which the worm is engaged with the worm wheel and a disengaged position, in which the worm is disengaged from the worm wheel.

The crank may advantageously be pivotable between a first state allowing movement in the axial direction of the worm shaft when the worm interacts with the worm wheel, and a second state in which the crank keeps the worm in engagement with the worm wheel while preventing movement of the worm shaft in the axial direction.

According to a second aspect of the present invention, there is provided a descending device for repeated braked descent of a load from an elevated structure, the descending device comprising: a housing attachable to the elevated structure; a descent shaft rotatably attached to the housing; a centrifugal brake comprising a fixed part connected to the housing and a rotatable part connected to the shaft; and a rope configured for attachment of the load at two different load attachment portions being separated by a descent length of the rope, the rope being wound around the shaft along a winding angle being substantially constant during the braked descent, the descending device further comprising an auxiliary driving arrangement for manual rotation of the descent shaft to raise or lower the load, the auxiliary driving arrangement comprising: a worm wheel connected to the descent shaft; a worm arranged on a worm shaft; and a crank connected to the worm shaft for allowing manual rotation of the descent shaft through a worm drive constituted by the worm wheel and the worm, wherein the worm shaft is displaceable in an axial direction between an operational position in which the worm is engaged with the worm wheel and a disengaged position, in which the worm is disengaged from the worm wheel.

Although a direct connection between the worm wheel and the descent shaft may be preferable, the worm wheel may alternatively be indirectly connected to the descent shaft, such as via a gear.

Through this arrangement, manually controlled raising or lowering of a load can be achieved without any unwanted descent in case the user lets go of the crank. Because of the inherent properties of the worm drive, there will be no movement of the crank if the user temporarily lets go of the crank. To allow the user to stop the manually controlled operation of the descending device, the worm can be disengaged from the worm wheel through axial displacement of the worm shaft.

The descending device according to this second embodiment of the present invention is fully combinable with the features of the first aspect of the present invention, and embodiments of, and effects obtained through this second aspect of the present invention are largely analogous to those described above for the first aspect of the invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF PREFERRED EMBODIMENTS

Figure 1:
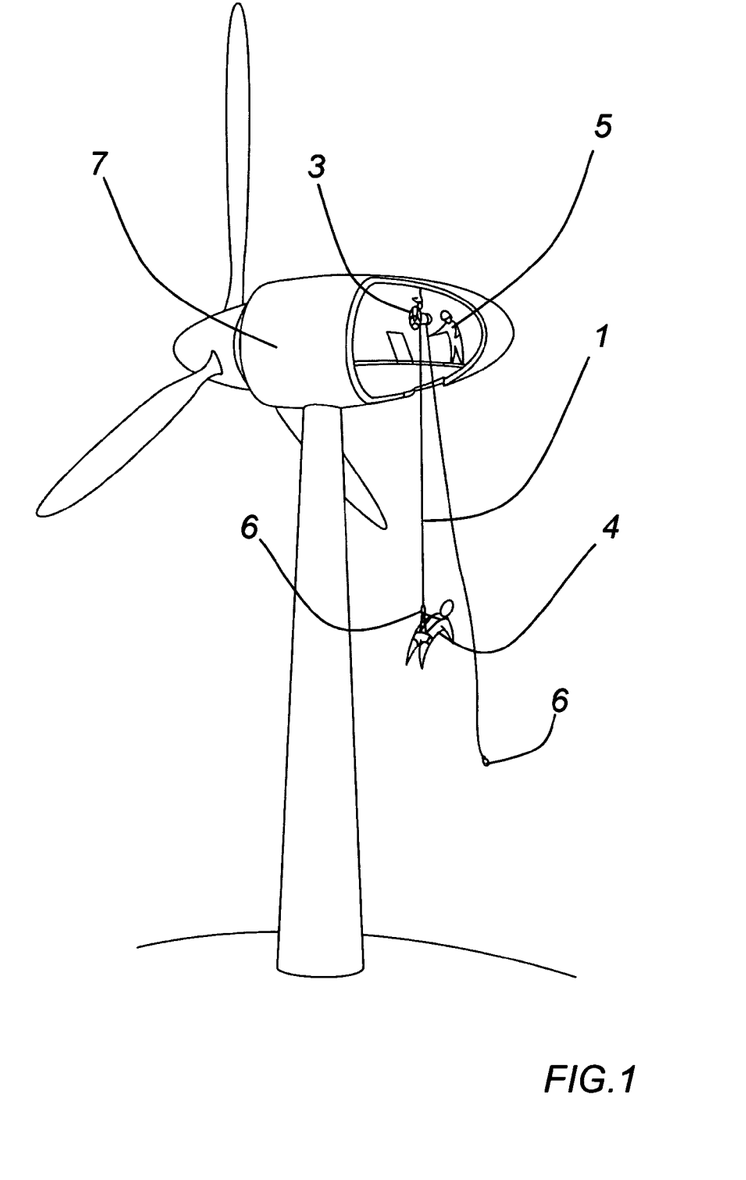
FIG. 1 is a schematic perspective view of a descending device according to various embodiments of the present invention in use for braked descent from the nacelle of a wind turbine, where the descending device is attached to the nacelle.

FIG. 1 shows an example of usage of the descending device 3 according to embodiments of the present invention for evacuation from the nacelle 7 of a wind turbine. The descending device 3, comprises a rope 1 with load attachment portions, here in the form of hooks 6.

In case of emergency, several persons 4, 5 may need to be evacuated from the nacelle 7. Using the descending device 3, descent of the first person 4 results in the hook 6 at the free end of the rope being raised to the nacelle 7, so that the second person 5 can be evacuated without delay. With embodiments of the descending device according to the present invention, two persons may simultaneously be evacuated from the nacelle 7.

Figure 2:
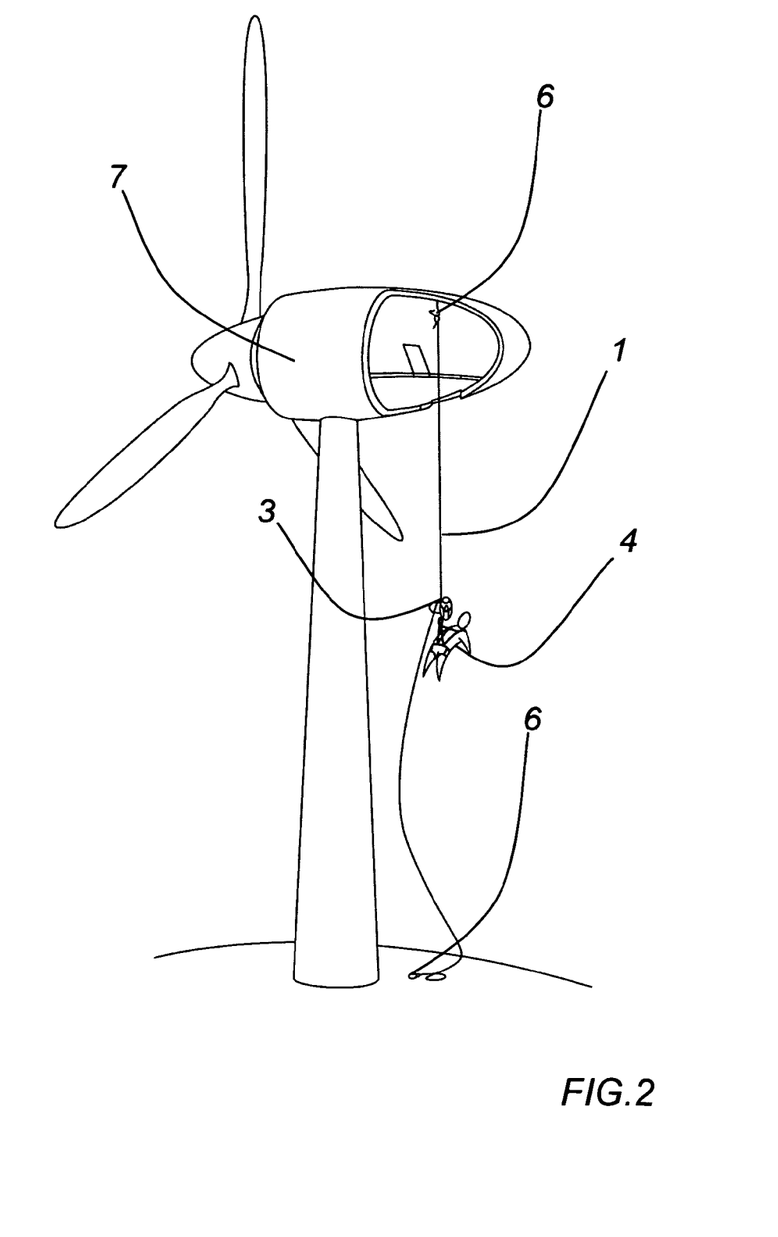
FIG. 2 schematically shows the situation where the descending device is attached to the descending person.

FIG. 2 illustrates the procedure for evacuation of the last person 4, or for evacuation of a single person from the nacelle 7. In this case, the descending device 3 may be attached to the person 4 to be evacuated.

Figure 3:
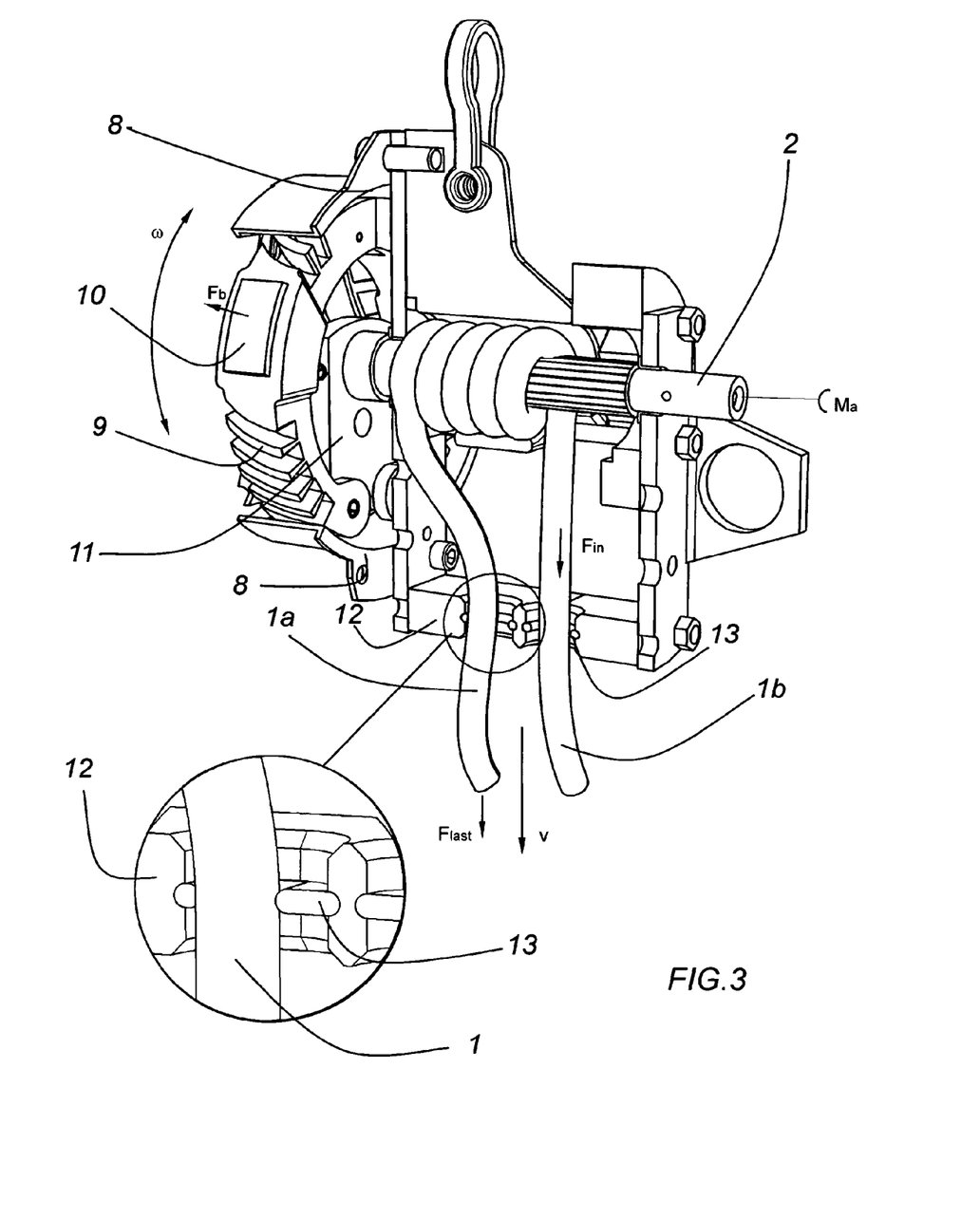
FIG. 3 is a perspective view of a first embodiment of the descending device in FIG. 1, where the descending device is shown partly open.

A first embodiment of the descending device 3 will now be described with reference to FIG. 3. In FIG. 3, the descending device 3 is shown in perspective with the rope 1 wound 4.5 revolutions (winding angle of 1620°) around the descent shaft 2 of the descending device. The descent shaft 2 is directly connected to the breaking shoes 9 of the centrifugal brake via a holder 11. The braking shoes 9 are provided with brake linings 10, which are pressed towards the inner surface of the fixed part 8 (the brake drum) of the centrifugal drum by the centrifugal force resulting from the rotation of the rotatable part.

The descending device in FIG. 3 further comprises a braking arrangement, here in the form of a friction block 12 provided with spring loaded chokes, such as rubber rings 13, at the passage of the rope 1 through the friction block 12. As can be seen in FIG. 3, the friction block is connected to the housing and arranged to provide a braking force to the rope 1 between the descent shaft 2 and the load attachment portions (not shown in FIG. 3) of the rope 1.

Figure 4:
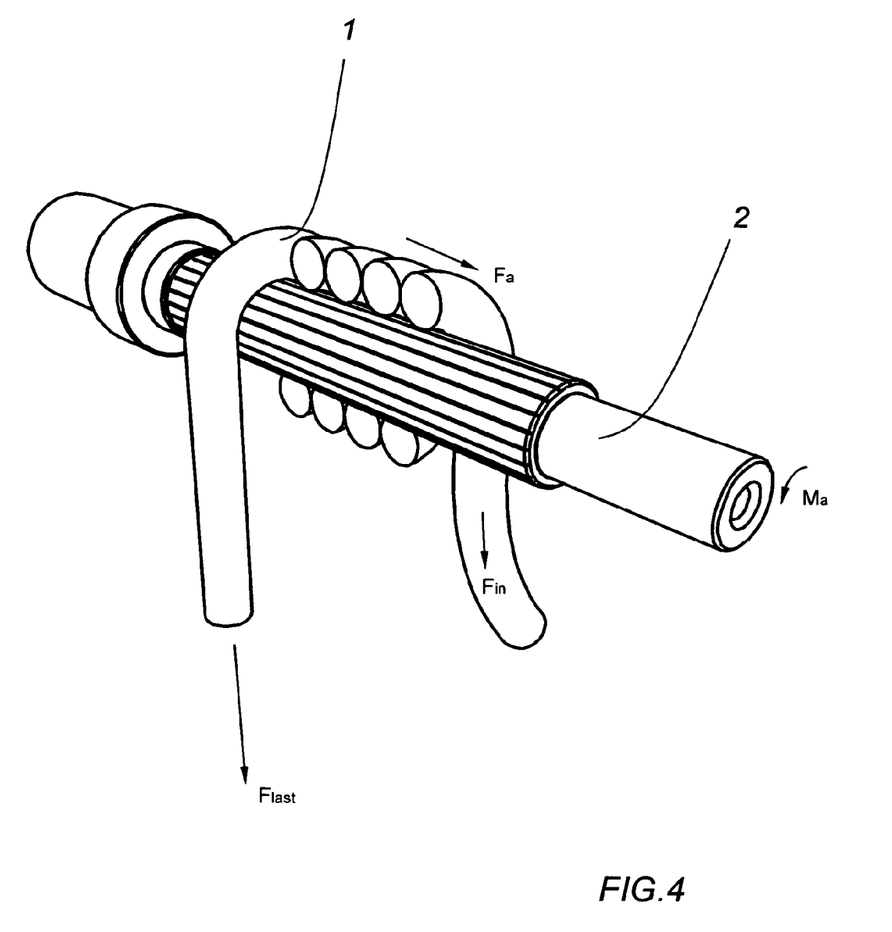
FIG. 4 is a perspective view of an exemplary descent shaft.

To allow the rope to glide in the axial direction along the descent shaft 2 while providing sufficient friction in the tangential direction, the descent shaft 2 is, as is schematically indicated in FIG. 3 and FIG. 4, provided with axially extending grooves which may, for example, be provided through knurling. Thereby, the friction coefficient becomes anisotropic, with a first value in the tangential direction and a second value in the axial direction, where the first value is higher than the second value.

A second embodiment of the descending device 3 will now be described with reference to FIG. 5. The descending device in FIG. 5 differs from that described above with reference to FIG. 3 in that it is provided with first and second spring loaded flanges 14 and an auxiliary driving arrangement for manual rotation of the descent shaft 2 for manually raising or lowering the load.

Figure 5:
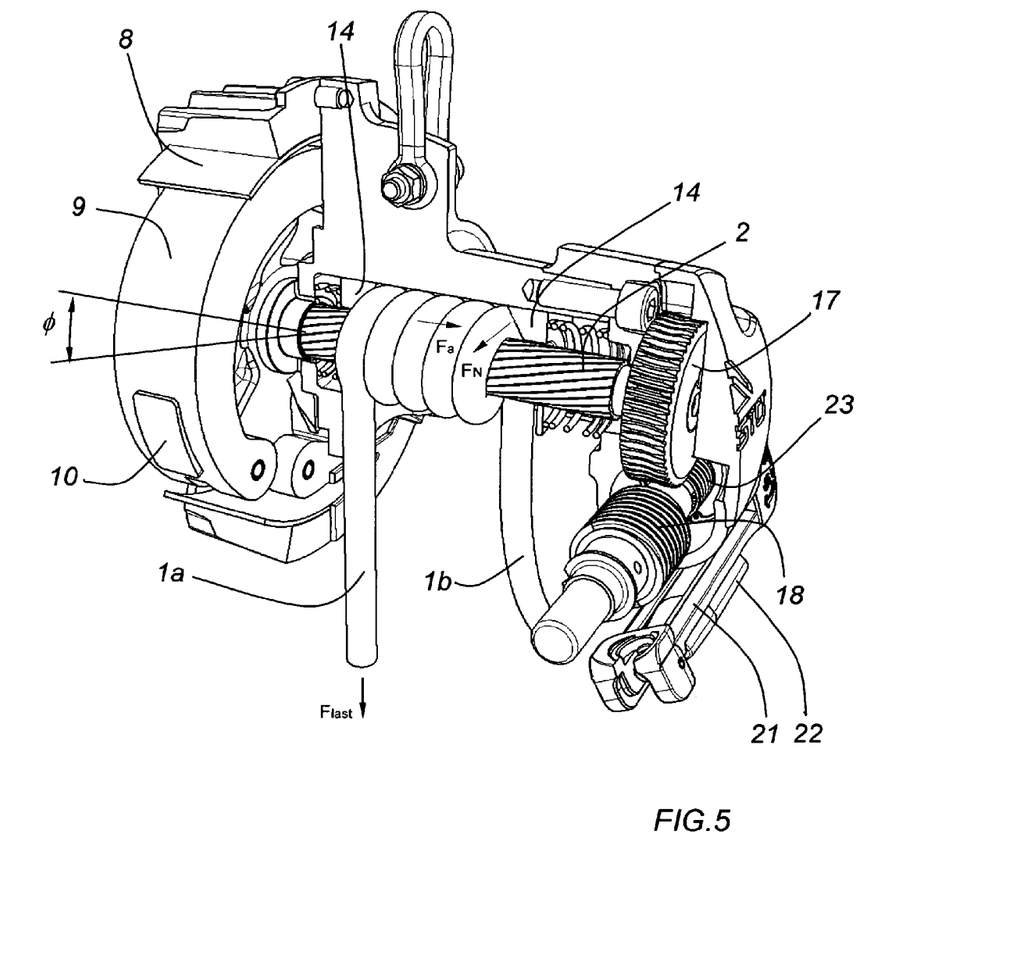
FIG. 5 is a perspective view of a second embodiment of the descending device in FIG. 1, where the descending device is shown partly open.

As is shown in FIG. 5, the first and second flanges 14 are angled towards the rope 1 so that the sides of the flanges 14 facing the rope 1 act on the rope with a force $F_N$ that has a force component that is directed towards the descent shaft 2 to provide a contact force between the rope 1 and the descent shaft 2.

As can also be seen in FIG. 5, the grooves provided on the descent shaft 2 may advantageously be arranged with a non-zero pitch angle $\phi$, to contribute in pushing the rope along the descent shaft 2 to reduce the force needed to pull the rope through the descending device 3. This is particularly useful when the rope is not carrying any load.

The auxiliary driving arrangement will be described further below with reference to FIGS. 8, 9 and 11a-b.

Figure 6:
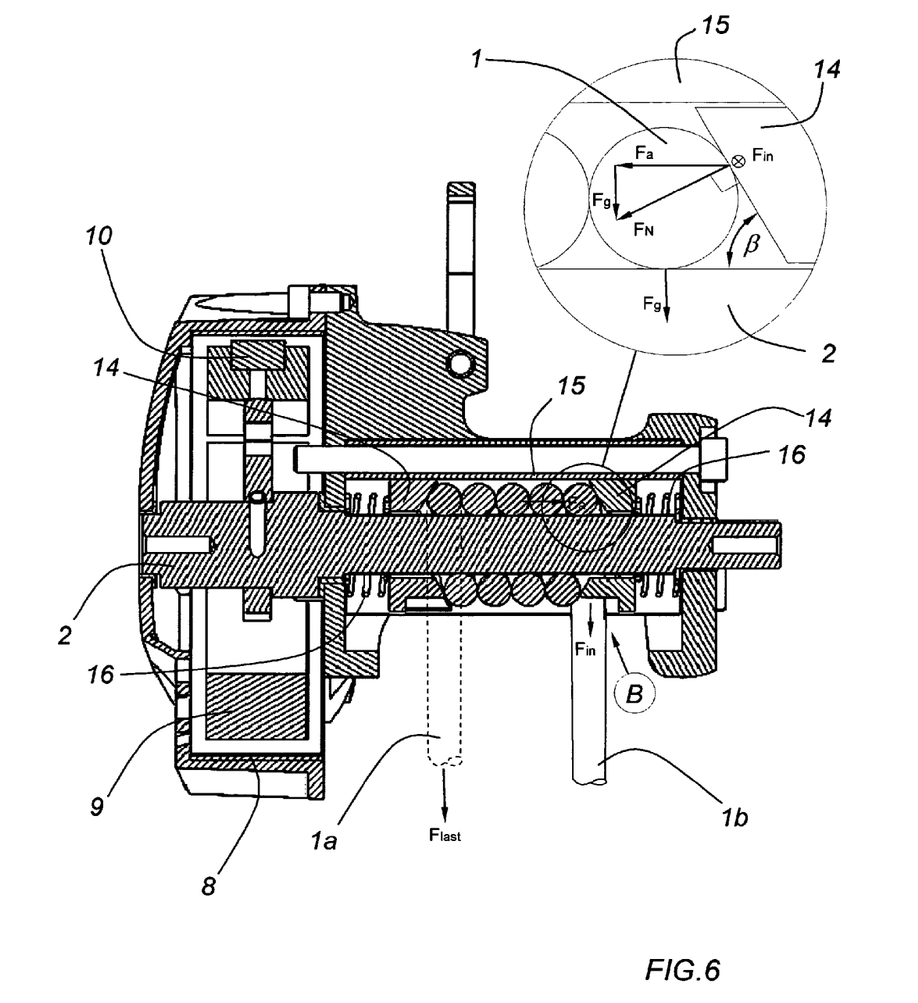
FIG. 6 is a partial cross-section view of the descending device in FIG. 5.

FIG. 6 schematically shows an embodiment without the above-mentioned auxiliary driving arrangement. As can be seen if FIG. 6 and FIG. 7, the flanges 14 are helically shaped and the side of each flange facing the rope 1 is angled by an angle $\beta$, which may for example be about 60°, so that the rope 1 is pressed towards the descent shaft 2.

To prevent a momentary loss of contact force between the rope 1 and the descent shaft 2 when the descent direction is reversed, each of the flanges 14 is pushed towards the rope 1 using a respective spring 16 as is schematically shown in FIG. 6. In this way, a contact force between the rope and the descent shaft 2 will always be provided. The flanges 14 may advantageously be rotationally fixed, and movable in the axial direction.

Figure 7:
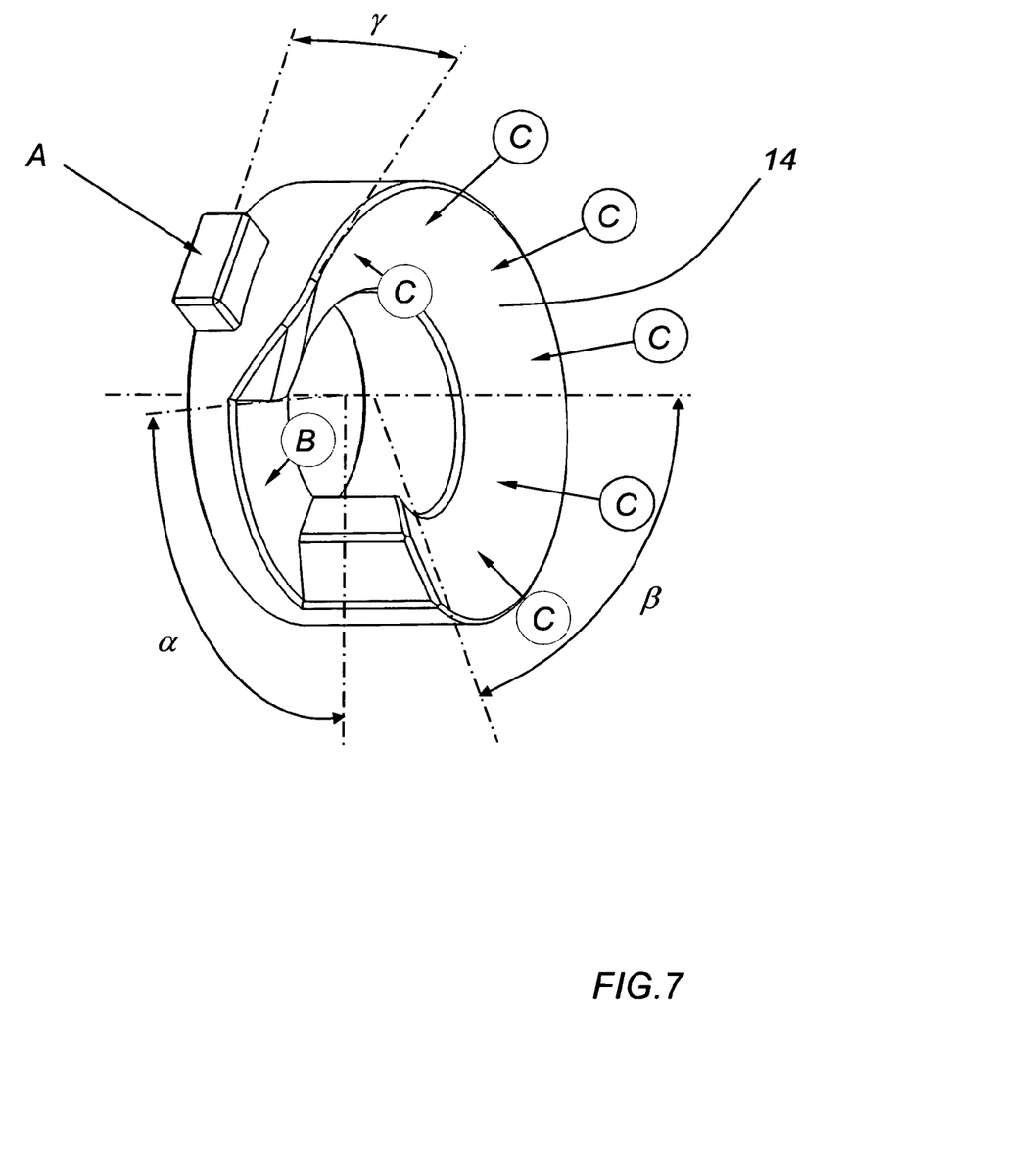
FIG. 7 is a perspective view of one of the movable flanges comprised in the descending device of FIGS. 5 and 6.

As can be seen in FIG. 7, which is a perspective close-up view of a flange 14, the flange 14 is provided with one or several torsion locking means 14 that travel in tracks in the housing 15, which are substantially parallel with the rotational axis of the descent shaft 2. The surface C for axial control of the rope 1 may advantageously be helically shaped with substantially the same pitch angle $\gamma$ as the rope 1 when the rope 1 is wound around the descent shaft 2. To allow "new" rope to be pulled into the descending device at position B in FIGS. 6 and 7 at the bottom portion of the housing 15, the helically shaped contact surface C is limited to a fraction of the circumference of the flange. The helically shaped contact surface C may, for example, extend along about 290°, leaving about 70° for allowing passage of "new" rope 1 into the descending device substantially without friction against the flange 14.

Figure 8:
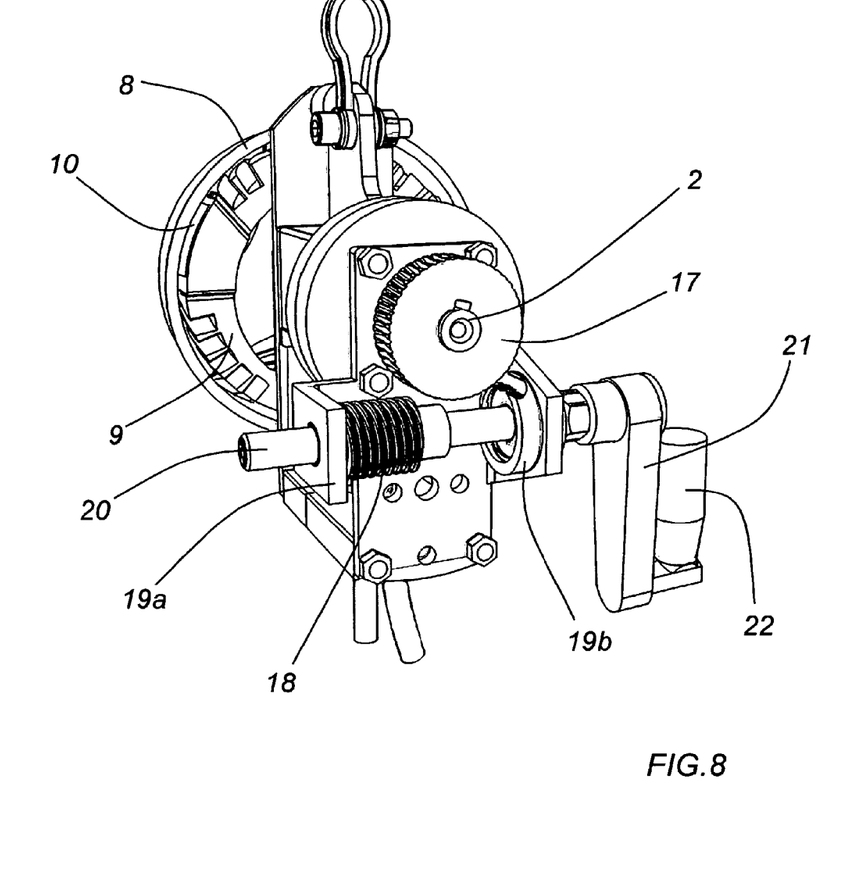
FIG. 8 is a perspective view of an embodiment of the descending device comprising an auxiliary driving arrangement, where the worm is disengaged from the worm wheel.

The auxiliary driving arrangement for manual lowering or raising of the load will now be described in more detail with reference to FIG. 8. As can be seen in FIG. 8, the auxiliary driving arrangement comprises a worm wheel 17 directly connected to the descent shaft 2, a worm 18 arranged on a worm shaft 20 and a crank 21 connected to the worm shaft 20 for allowing manual rotation of the descent shaft 2 through a worm drive constituted by the worm wheel 17 and the worm 18. The crank 21 is provided with a foldable handle 22. As is shown in FIG. 8, the worm shaft 20 is rotatably connected to the housing at bearings 19a-b. Furthermore, the worm shaft 20 is displaceable in the axial direction between an operational position in which the worm 18 is engaged with the worm wheel 17 and a disengaged position, in which the worm 18 is disengaged from the worm wheel 17. In FIG. 8, the worm shaft 20 is shown in its disengaged position.

Figure 9:
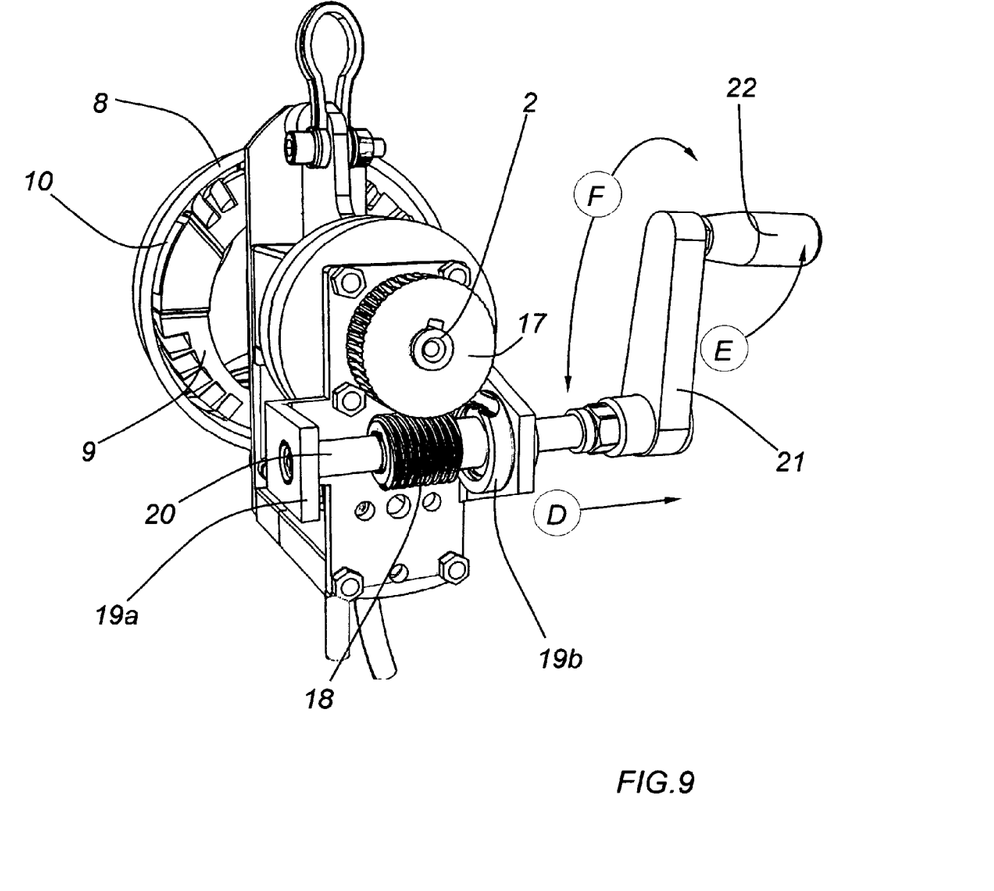
FIG. 9 is a perspective view of an embodiment of the descending device comprising an auxiliary driving arrangement, where the worm is engaged with the worm wheel.

Turning now to FIG. 9, the worm shaft 20 is instead shown in its operational position, in which the worm 18 is engaged with the worm wheel 17, which enables manual rotation of the descent shaft 2 through rotation of the crank 21. With the worm shaft 20 in this operational position, the load can be raised and/or lowered by rotating the crank 21.

The axial movement of the worm shaft 20 to engage or disengage the worm drive should preferably be carried out with the load standing still and the descent shaft substantially unloaded. This may be achieved by winding the rope 1 around a substantially cylindrical portion of the housing 15 of the descending device 3, as is schematically illustrated in FIG. 10.

Figure 11A:
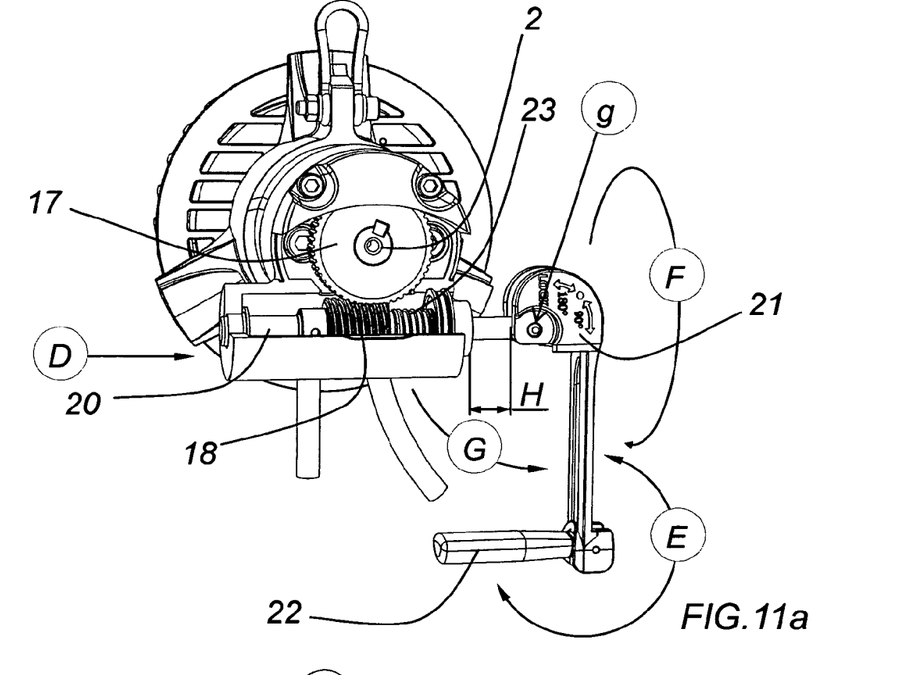
FIGS. 11a-b schematically illustrate operation of the auxiliary driving arrangement.
Figure 11B:
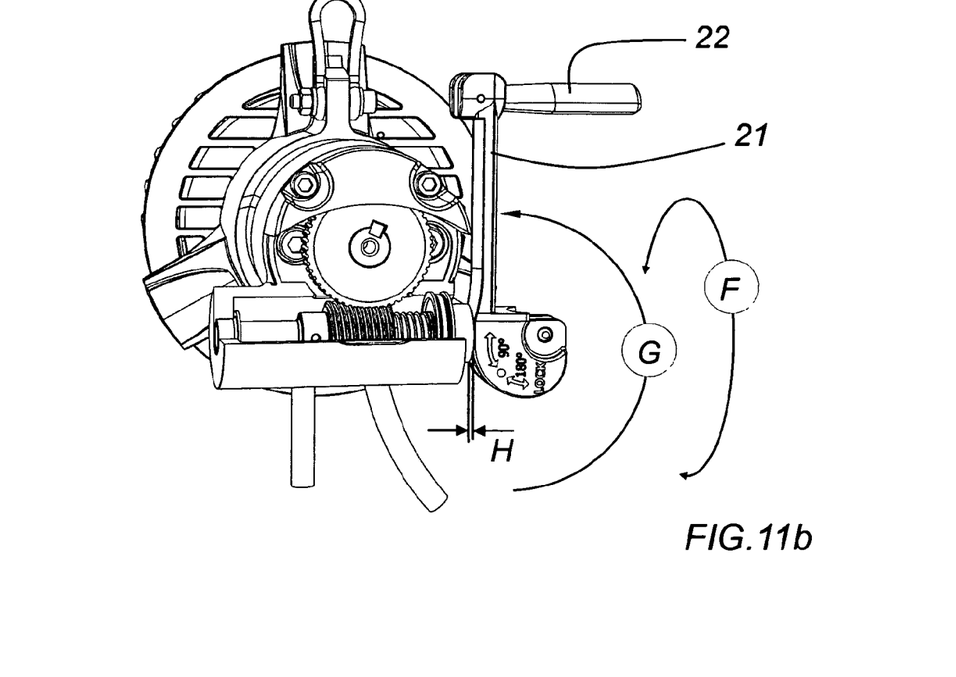

FIGS. 11a-b schematically show yet another embodiment of the descending device 3 according to the present invention, in which the crank 21 is pivotable between a first state allowing movement in the axial direction of the worm shaft 20 when the worm 18 interacts with the worm wheel 17, and a second state (FIG. 11b) in which the crank 21 keeps the worm 18 in engagement with the worm wheel 18 while preventing movement of the worm shaft 20 in the axial direction. This is achieved by the eccentric base of the crank, which, in the second state of the crank (FIG. 11b), fills up the space indicated by 'H' in FIG. 11a.

Figure 10:
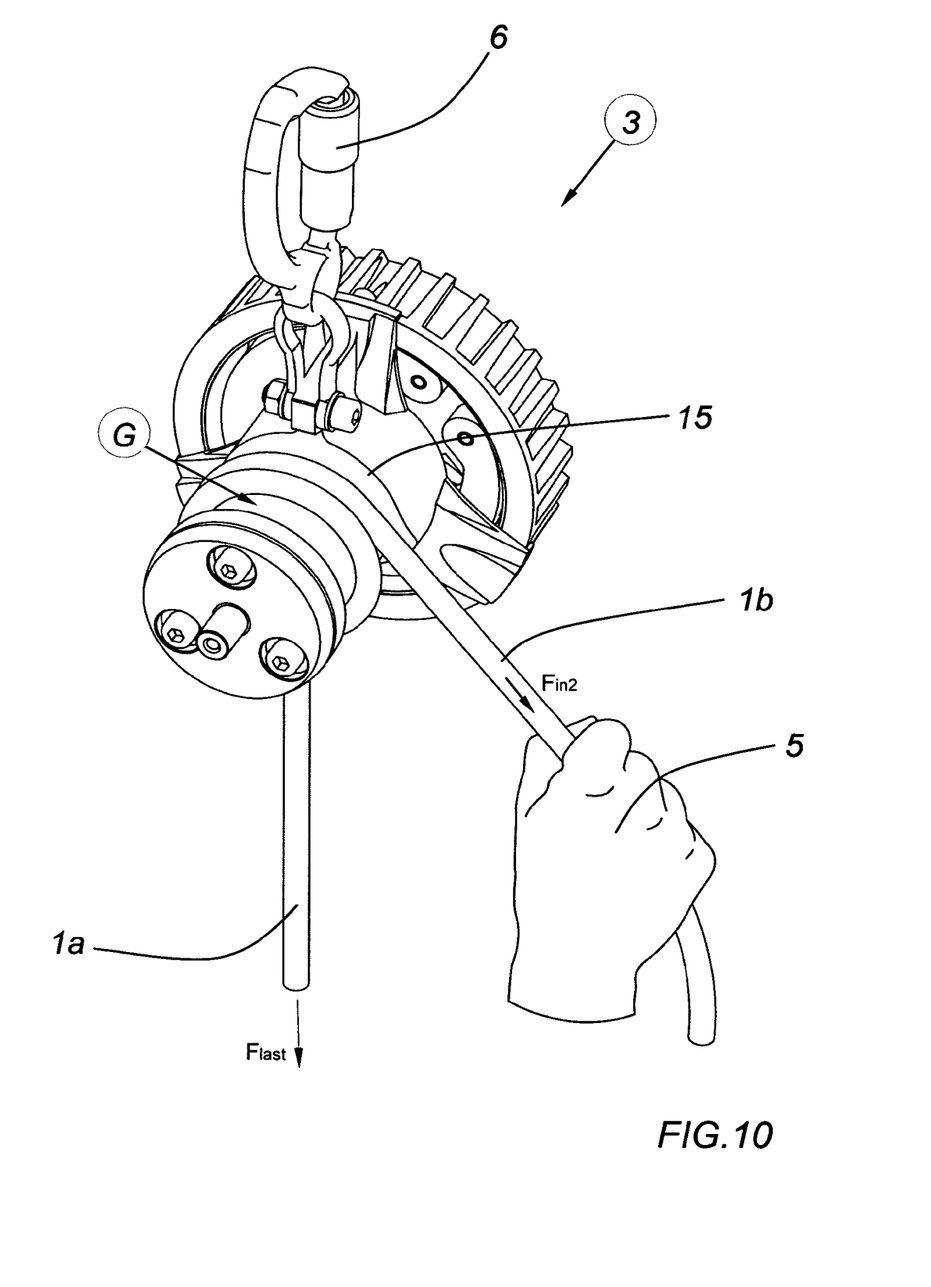
FIG. 10 schematically illustrates a further embodiment of the descending device according to the present invention, where the user can wind the rope around the housing of the descending device to temporarily manually prevent descent.

To return to the first state from the second state, the load may be held manually as illustrated in FIG. 10, whereafter the crank is pivoted to the state in FIG. 11a and rotated to disengage the worm 18 from the worm wheel 17. When the worm 18 is disengaged from the worm wheel 17, the worm shaft 20 (and worm 18) is pushed away from engagement with the worm wheel through a spring 23.

Figure 12:
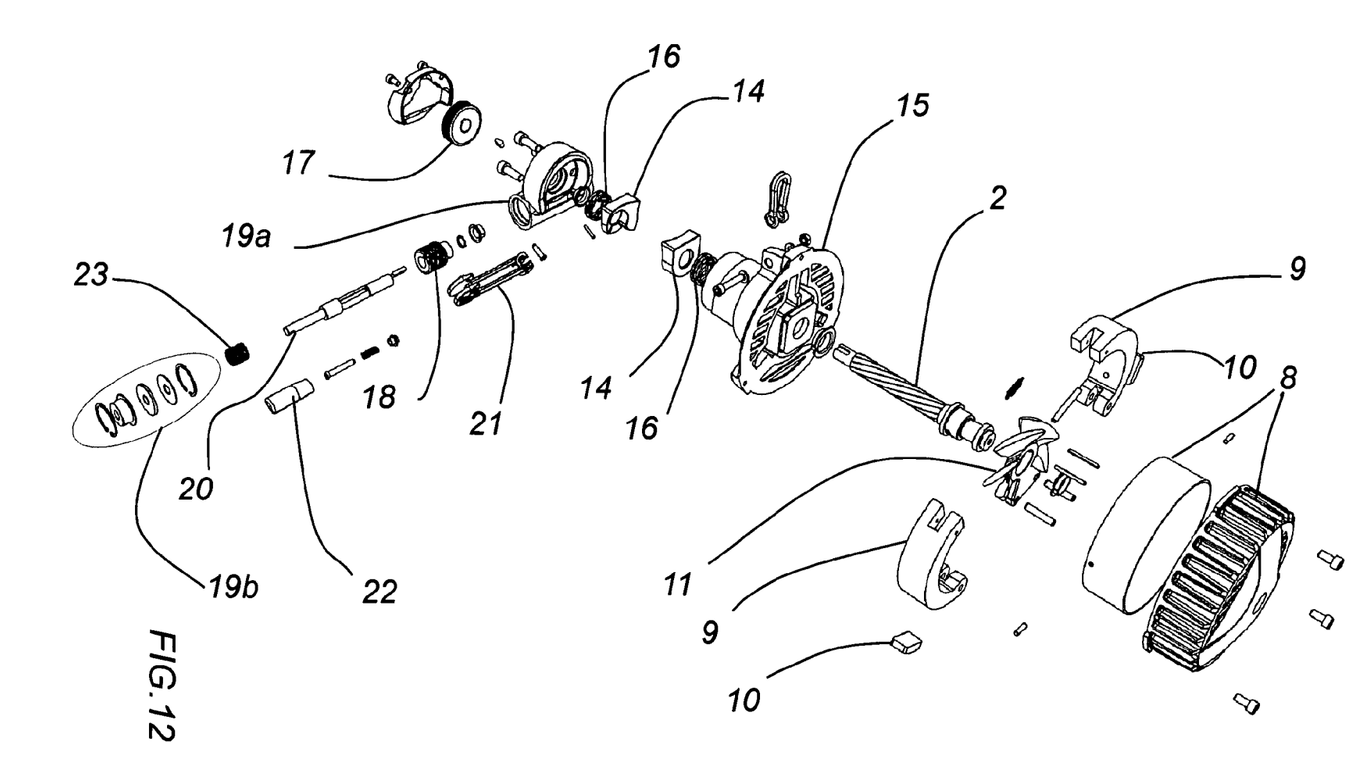
FIG. 12 is an exploded view of an embodiment of the descending device according to the present invention.

Finally, FIG. 12 is an exploded view of an embodiment of the descending device 3 according to the invention, where the reference numerals indicate:

2 descent shaft
8 brake drum
9 brake shoe
10 brake lining
11 brake holder with fan functionality
14 flange
15 housing
16 spring acting on flange
17 worm wheel
18 worm
19 bearing for worm shaft 20
20 worm shaft
21 crank
22 handle
23 spring Repeated descent of load, such as persons from an elevated structure, such as a wind turbine, results in generation of a substantial amount of heat in the centrifugal brake. In order to cool the descending device during operation, the fixed part 8 of the centrifugal brake may advantageously be at least partly open so that air can flow through the centrifugal brake. For example the embodiment shown in FIG. 3 comprises fan wings for contributing to an increased flow of air through the centrifugal brake. FIG. 12 shows another configuration.

The open architecture of the centrifugal brake may also improve the functionality of the descending device in conditions with rain or snow followed by freezing temperatures, since water can be prevented from accumulating, which prevents the formation of ice, which may otherwise hamper operation of the descending device.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

We claim:

1. A descending device for repeated braked descent of a load from an elevated structure, said descending device comprising:
   a housing attachable to said elevated structure;
   a descent shaft rotatably attached to said housing;
   a centrifugal brake comprising a fixed part connected to said housing and a rotatable part connected to said descent shaft; and
   a rope configured for attachment of said load at two different load attachment portions being separated by a descent length of said rope, said rope being wound around said descent shaft along a winding angle being substantially constant during said braked descent,
   wherein:
   said descent shaft is directly connected to said rotatable part of the centrifugal brake such that one revolution of said descent shaft translates to one revolution of said rotatable part of the centrifugal brake;
   said winding angle is at least 360°; and
   said descent shaft is configured to allow the rope to slide axially along the descent shaft during descent,
   wherein said descending device further comprises a first flange and a second flange arranged to at least partly surround the descent shaft for restricting movement of said rope in an axial direction in respect of said descent shaft during said braked descent, wherein each of said first flange and said second flange, on a side facing said rope, is shaped in such a way that pressing said rope towards said flange in an axial direction along said descent shaft results in a force provided by said flange on said rope with a force component directed towards said descent shaft,
   wherein at least one of said first flange and said second flange is movable relative to said descent shaft in said axial direction, and said descending device further comprising spring means arranged to press said at least one of said first and second flange towards said rope being wound around said descent shaft.

2. The descending device according to claim 1, wherein said winding angle is at least 1260°.

3. The descending device according to claim 1, further comprising means for tensioning arranged to provide a contact force between said rope and said descent shaft.

4. The descending device according to claim 3, wherein said means for tensioning comprises a braking arrangement connected to the housing and arranged to provide a braking force to said rope between said descent shaft and each of said load attachment portions of the rope.

5. The descending device according to claim 4, wherein said braking arrangement comprises at least one opening through which said rope runs during said descent, said at least one opening being configured in such a way that a friction force acts between said at least one opening and said rope.

6. The descending device according to claim 1, wherein said first flange and said second flange are arranged to be rotationally stationary in relation to the descent shaft, so that rotation of the descent shaft results in a relative motion between the descent shaft and the first and second flanges.

7. The descending device according to claim 1, wherein each of said first flange and said second flange has a helical configuration on a side facing said rope, with a pitch (γ) substantially corresponding to that of said rope being wound around said descent shaft.

8. The descending device according to claim 1, wherein said descent shaft is structured to provide a higher friction coefficient in said radial direction than in said axial direction.

9. The descending device according to claim 1, wherein said housing comprises a substantially cylindrical portion around which said rope can be wound to temporarily manually hold said load.

10. The descending device according to claim 1, wherein said fixed part of the centrifugal brake is at least partly open to the environment, and said rotatable part of the centrifugal brake comprises fan blades, for cooling the centrifugal brake during operation of the descending device.

11. The descending device according to claim 1, further comprising an auxiliary driving arrangement for manual rotation of said descent shaft to raise or lower said load, said auxiliary driving arrangement comprising:
   a worm wheel connected to said descent shaft;
   a worm arranged on a worm shaft; and
   a crank connected to said worm shaft for allowing manual rotation of said descent shaft through a worm drive constituted by said worm wheel and said worm,
   wherein said worm shaft is displaceable in an axial direction between an operational position in which said worm is engaged with said worm wheel and a disengaged position, in which said worm is disengaged from said worm wheel.

12. The descending device according to claim 11, wherein said crank is pivotable between a first state allowing movement in said axial direction of said worm shaft when said worm interacts with said worm wheel, and a second state in which said crank keeps said worm in engagement with said worm wheel while preventing movement of said worm shaft in said axial direction.

13. A descending device for repeated braked descent of a load from an elevated structure, said descending device comprising:
   a housing attachable to said elevated structure;
   a descent shaft rotatably attached to said housing;
   a centrifugal brake comprising a fixed part connected to said housing and a rotatable part connected to said descent shaft; and
   a rope configured for attachment of said load at two different load attachment portions being separated by a descent length of said rope, said rope being wound around said descent shaft along a winding angle being substantially constant during said braked descent,
wherein:
   said descent shaft is directly connected to said rotatable part of the centrifugal brake such that one revolution of said descent shaft translates to one revolution of said rotatable part of the centrifugal brake;
   said winding angle is at least 360°; and
   said descent shaft is configured to allow the rope to slide axially along the descent shaft during descent,
   wherein said descending device further comprises a first flange and a second flange arranged to at least partly surround the descent shaft for restricting movement of said rope in an axial direction in respect of said descent shaft during said braked descent, wherein at least one of said first flange and said second flange is movable relative to said descent shaft in said axial direction, and said descending device further comprising spring means arranged to press said at least one of said first and second flange towards said rope being wound around said descent shaft.

* * * * *